US006549434B2

(12) United States Patent
Zhou et al.

(10) Patent No.: US 6,549,434 B2
(45) Date of Patent: Apr. 15, 2003

(54) HARMONIC MITIGATING METHOD AND APPARATUS

(75) Inventors: Dongsheng Zhou, Cedarburg, WI (US); Gary L. Skibinski, Milwaukee, WI (US); Walt A. Maslowski, Oak Creek, WI (US); Brian R. Buchholz, Pewaukee, WI (US); Nick N. Guskov, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/956,780

(22) Filed: Sep. 20, 2001

(65) Prior Publication Data

US 2003/0053320 A1 Mar. 20, 2003

(51) Int. Cl.$^7$ ................................................. H02J 1/02
(52) U.S. Cl. .......................................... 363/39; 307/105
(58) Field of Search ............................... 363/39, 40, 41, 363/95, 97, 98; 323/207, 200, 211; 307/105

(56) References Cited

U.S. PATENT DOCUMENTS 5,526,252 A * 6/1996 Erdman ........................ 363/41
6,127,743 A * 10/2000 Levin et al. ................. 307/105
6,339,265 B1 * 1/2002 Levin et al. ................. 307/407

* cited by examiner

Primary Examiner—Adolf Denske Berhane
(74) Attorney, Agent, or Firm—Michael A. Jaskolski; Alexander M. Gerasimow; William R. Walbrun

(57) ABSTRACT

A harmonic mitigating apparatus connected between a three phase power source and a load provides a multiple-winding reactor for reducing harmonics directed from the load to the source, the apparatus including, for each system phase, first and second line windings in series between the source and load and oriented so as to have the same polarity such that the winding fluxes add thereby increasing total reactance to harmonics directed from the load to the supply, the apparatus also including at least one trap circuit including a series inductance and capacitor for each phase and linked between the first and second line windings and a neutral point (or another phase), the trap circuit characterized by a reactance that is lower than the reactance of the first line winding such that harmonics flow into the trap circuit, for each phase, at least two of the first and second line windings and the trap winding arranged on the same core.

14 Claims, 2 Drawing Sheets

HARMONIC MITIGATING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to harmonic mitigating devices for electrical power distribution systems and more particularly to a passive harmonic mitigating device for connection between a power distribution system and one or more harmonic-generating loads that reduces the level of harmonic currents flowing into the power distribution system.

Electrical distribution systems used to distribute electrical power to buildings, manufacturing facilities, etc., are often subjected to harmonic currents generated by non-linear loads such as electronic equipment, adjustable speed drives (ASD), uninterruptible power supplies (UPS), power rectifiers, etc. Among other harmonics, it is known that these loads are capable of routinely causing 5th, 7th, 11th, 13th, 17th, 19th, 23rd, 25th etc. harmonics in the power distribution system.

As well known in the art, load generated harmonic currents cause many problems in power distribution systems including increasing the voltage total harmonic distortion level, reducing the electromagnetic compatibility of the loads, reducing reliability of the power distribution equipment, increasing power losses, reducing system power factor, etc.

Prior art systems for mitigating harmonic currents have included configurations that can be grouped into many different categories. One important category of mitigating system is generally referred to as a passive filter network. Passive networks are systems wherein devices within the networks are selected to configure filters based on desired operating characteristics and then, as the name implies, the networks themselves operate, independent of controllers or the like, to reduce harmonics.

One type of passive filter network includes a plurality of trap filters that are individually tuned to eliminate specific harmonics. For instance, because the $5^{th}$, $7^{th}$ and $11^{th}$ harmonics typically have the largest magnitudes, one exemplary passive network includes three trap filters arranged in parallel between the source and load, one filter for each of the $5^{th}$, $7^{th}$ and $11^{th}$ harmonics. Often the filter that mitigates the $11^{th}$ harmonic will be designed to mitigate higher order harmonics as well. Each filter includes a reactor including inductive windings disposed on a core, capacitors and typically resistors wherein the capacitors and resistors are arranged in either a delta or wye configuration. Another exemplary passive filter network includes three trap filters arranged in series between the source and load, each filter tuned to mitigate specific harmonics and including a separate core, inductive windings, resistors and capacitors.

These multi-filter networks are advantageous in that the fluxes generated by the windings are relatively simple and easy to comprehend and therefore the networks are easy to design and construct. To this end, because multi-filter networks include separate cores for each of the trap filters, there is no need to account for mutual inductance between filter windings during design.

Unfortunately, while simple to design and construct, the multi-filter networks require a large number of components including resistors, capacitors, windings and a separate core for each of the filters in the network. Not only are the large number of components expensive but the number of components increases overall space required to house the networks.

In an effort to reduce network size and component related costs, another type of passive filter network has been developed which is referred to generally as a broad band filter network. Instead of requiring separate resistors and capacitors for each harmonic to be mitigated, broadband networks typically include first and second line reactors, a trap reactor and a delta or wye connected capacitive and resistive assembly. The first line reactor includes a separate winding for each of the three supply lines in a three phase system, each winding disposed on a first reactor core and linked to a separate one of the supply lines at a first end and to a separate one of three central nodes at a second end. Similarly, the second line reactor includes a separate winding for each of the three supply lines in a three phase system where each winding is disposed on a second reactor core and is linked to a separate one of the central nodes at a first end and to the load at a second end. Thus, in series between each supply line and the load are separate windings corresponding to each of the first and second reactors. The trap reactor includes a third core on which are disposed three separate trap windings, a separate one of the trap windings linked to a separate one of the central nodes at one end and linked to the capacitive/resistive assembly at the other end.

In this case the first and second line reactors provide large reactance to harmonics traveling along the supply line while the trap reactor is tuned to provide minimal reactance to the harmonics such that the harmonics travel into the trap circuit where they are effectively "trapped" (hence the label "trap circuit") within the capacitive/resistive network.

While advantageous over the multi-filter designs because component count is reduced appreciably and therefore cost and required volume are reduced, three core broadband filters as described above are disadvantageous in that they still require three separate cores (i.e., a separate core for each of the first, second and trap reactors). Again, any design requiring additional components typically increases overall network cost and space required to house the network.

Recently some single core broadband filter networks have been designed that reduce overall network size appreciably. To this end, U.S. Pat. No. 6,127,743 (hereinafter "the '743 patent") teaches a filter network that includes all network windings on a single core. Specifically, the '743 patent teaches a first set of reactor windings including a separate first winding for each of the supply lines, a second set of reactor windings including a separate second winding for each of the supply lines wherein a separate one of the second windings is linked in series with a separate one of the first windings between the supply and the load and a set of trap reactor windings that are linked to central nodes between the first and second windings of each line. As in the case of three core broad band networks described above, the '743 patent network also includes a capacitive/resistive assembly linked to the trap reactor windings. Importantly, the '743 patent teaches that the first and second windings are disposed on the core in opposite orientations (i.e., the first winding in each series is in a first orientation and the second winding in each series is in an opposite orientation). The '743 patent teaches that this opposing orientation is necessary in order to minimize the voltage drop across the filter network while still mitigating supply line harmonics.

Thus, the '743 patent claims that the networks disclosed therein have many advantages and it would be advantageous to have other network configurations that could provide similar advantages.

In addition, while the '743 patent advantageously reduces the core material required to configure a workable network and therefore reduces system costs, unfortunately, the task of designing and constructing finely tuned single core networks is exacerbated by the fact that the inductances between the single core windings become relatively complex due to mutual inductances between the separate first, second and trap windings. In some cases the extra design and construction costs needed to account for the mutual inductances may be greater than the costs associated with the savings in core material. Thus, it would be advantageous to have a filter network configuration which has some of the advantages associated with a reduced number of cores and components while being characterized by inductance parameters that facilitate a simpler design.

BRIEF SUMMARY OF THE INVENTION

It has been determined that, despite teachings in the '743 patent that line windings have to be oppositely disposed on a core to achieve desirable harmonic mitigating results without excessive voltage drop, the line windings can instead be disposed so as to have the same polarity and still achieve desired harmonic mitigation with an acceptably low voltage drop. To this end, it has been recognized that by aligning line windings with the same polarity in first and second line reactors, the combined reactance of the series windings cooperates to block harmonics such that some of the harmonics are blocked from the load while other harmonics can be forced into a trap filter. Because the reactances (i.e., the winding fluxes) combine instead of cancel, the total inductance within the line can be reduced by reduction in copper material utilization and the voltage drop can be held to an acceptably low value (e.g., 5% of a drive rating). In fact, it has been determined that with proper component selection, operating characteristics that are essentially identical to the characteristics achievable via the '743 patent network can be obtained via a network configuration including same polarity line windings in the line portion of the filter network.

In addition, it has been recognized that a compromise between networks that include three separate cores which are bulky and expensive but relatively easy to design due to no mutual couplings between windings and networks including a single core which are relatively less bulky and less expensive to configure but are more difficult to design because of mutual coupling that has to be understood and accounted for can be struck where two cores are used, a first core including two of three network windings and a second core including the third of the three network windings. In this case winding polarities of the two common core windings may be the same or opposite if components and configurations are selected properly. Where the common core windings are disposed in opposite polarities the teachings of the '743 patent are applicable.

An exemplary embodiment of the invention includes an apparatus for mitigating harmonic currents generated by a load connected to a power distribution source via a supply line. In one embodiment the apparatus comprises first and second magnetic cores, first and second series line windings linked between the supply line and the load and at least one trap circuit including a series linked capacitor and trap winding linked at an intermediate node between the first and second line windings and an output connected to a second line. Here, two of the first, second and trap windings are disposed on the first magnetic core and the third of the windings is disposed on the second core.

In some embodiments the first and second line windings are disposed on the first core and may or may not have the same polarity. In other embodiments the trap winding and one of the first and second line windings is disposed on the first core. The trap circuit may include a capacitor in series with the trap winding between the first and second lines.

The source and load may be three phase. In the case of a three phase system, the first line winding includes a separate first line winding for each phase, the second line winding includes a separate second line winding for each phase and the trap winding includes a separate trap winding for each phase.

The invention also includes an apparatus for mitigating harmonic currents generated by a load connected to a power distribution source via a supply line where the apparatus comprises at least one magnetic core including a first core, first and second line windings in series between a supply line and the load such that the first and second line windings are disposed on the first core so as to have the same polarity and at least one trap circuit including a series linked capacitor and trap winding linked to an intermediate node between the first and second line windings with an output connected to a second line with the trap winding disposed on the at least one core. Here a reactance to harmonic currents between the load and the source is increased by the summation of fluxes generated by the line windings and a selected portion of the harmonic currents is diverted through the trap circuit.

The at least one core may include a second core and the trap winding may be disposed on the second core. In the alternative, the at least one core may consist of the first core. Again, in this case the system may be three phase and, in that case, the first line winding includes a separate first line winding for each phase the second line winding includes a separate second line winding for each phase and the trap winding includes a separate trap winding for each phase.

The invention also includes a method for mitigating harmonic currents generated by a load connected to a power distribution source via a supply line, the method comprising the steps of providing first and second magnetic cores, providing first and second series line windings linked between the supply line and the load, providing at least one trap circuit including a series linked capacitor and trap winding linked at an intermediate node between the first and second line windings and an output connected to a second line and disposing two of the first, second and trap windings on the first magnetic core and the third of the windings on the second core.

The step of disposing may include disposing the first and second line windings on the first core with the same or opposite polarity. In the alternative, the step of disposing may include the step of disposing the trap winding and one of the first and second line windings on the first core.

In addition, the invention also includes a method for mitigating harmonic currents generated by a load connected to a power distribution source, the method comprising the steps of providing at least one magnetic core including a first core, providing first and second line windings and a trap winding, disposing the first and second windings on the first core so as to have the same polarity, linking the first and second line windings in series between a supply line and the load, disposing the trap winding on the at least one core, and linking the trap winding to an intermediate node between the first and second line windings with an output linked to a second line.

Here again, a reactance between the load and the source is increased by the summation of fluxes generated by the line windings and a selected portion of the harmonic currents is diverted through the trap circuit. The at least one core may include only the first core.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
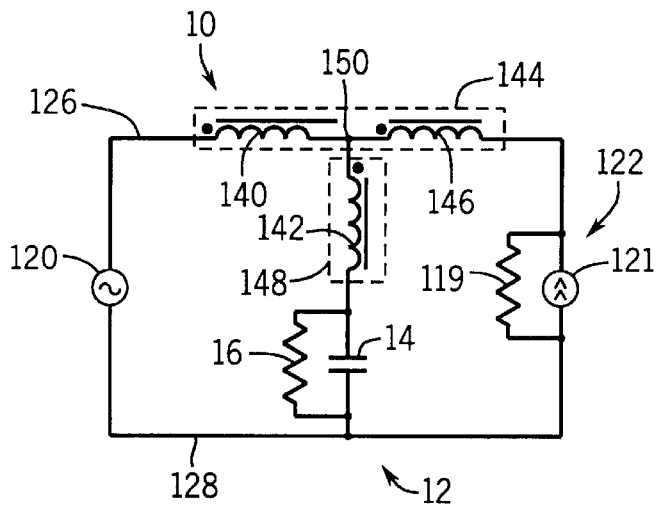
FIG. 1 is a schematic diagram of a single phase filter network linked to a source and a load according to one aspect of the invention.

In the following specification several embodiments of the invention are illustrated and described. To simplify this explanation common notations and ways of identifying different components and relationships of components are adopted that are used throughout the specification. To this end, reactor cores are identified by a dashed line that encompasses windings that are wound about the core to form a corresponding reactor. For instance, in FIG. 1, windings 140 and 146 are wound about a first core identified by dashed box 144 while winding 142 is wound about a second core identified by dashed box 148. As another instance, conventional dot symbols are used to identify the start of each winding illustrated. Thus, for example, in FIG. 1 winding 140 begins at the left end of the winding as illustrated (i.e., at the corresponding dot).

In addition, exemplary power distribution sources or systems 120 and loads 122 are assumed and numbers 120 and 122 are used to identify source and load, respectively, throughout the specification. In each of the illustrated embodiments power distribution system 120 may be any AC electrical power source but is typically a power supply powered by an electrical utility grid or a generator. Exemplary load 122 includes one or more harmonic-generating (non-linear) loads. Referring to FIG. 1, in the interest of simplifying this explanation, while load 122 may take any of several different forms, it will be assumed that load 122 is an adjustable speed drive (ASD) that can be modeled as a load resistance 119 in parallel with a load current source 121. In FIG. 1 the load 120 is modeled as a single phase load but it should be understood that load 120 may be a multiphase load (e.g., typically a three phase load). Cores (e.g., 144, 148) may be provided with at least one non-magnetic gap (not illustrated) since the magnetic characteristics of ferrous materials are nonlinear and vary widely with the load current.

Referring now to the drawings wherein like reference characters are used to refer to similar elements and signals throughout the several views and, more specifically, referring to FIG. 1, a single phase embodiment 10 of the present invention is illustrated in the context of exemplary voltage source 120 and load 122. In this case system 120 provides voltage across first and second lines 126 and 128 to an inventive filter network 12 and load 122 linked thereto.

Network 12 includes first and second line windings 140 and 146, a trap winding 142, a capacitor 14, a resistor 16 and two cores represented by dashed boxes 144 and 148. In the illustrated embodiment 10, windings 140 and 146 are positioned in series within line 126 between supply 120 and load 122 and are arranged on magnetic core 144 so as to have the same polarity (see dot symbols). It will be assumed that windings 140 and 146 have reactances X1 and X2, respectively. Line windings 140 and 146 thus carry the load current from power system 120 through first line 126 to load 122.

Windings 140 and 146 are configured and arranged so as to provide a low reactance fundamental current path between power system 120 and load 122 while providing a high reactance to harmonics generated by load 122. To this end, as well known in the filter art, reactors generally provide higher impedance or reactance to high frequency currents than they provide to low frequency currents. Thus, because the fundamental has a lower frequency than harmonics thereof, line windings can be designed that provide minimal reactance to the fundamental current but large reactance to the harmonics.

The reactance of each winding 140, 146 is proportional to the square of the number of turns of the winding 140 or 146 wound on the core 144. Because the line windings 140 and 146 are oriented with the same polarities, fluxes generated by current passing through the windings add to provide a relatively large reactance to harmonics traveling from load 122 toward supply 120.

Referring still to FIG. 1, a trap circuit 12 includes trap winding 142, capacitor 14 and resistor 16 and links lines 126 and 128. Circuit 12 is linked to line 126 at a central node 150 between windings 140 and 146. Capacitor 14 and resistor 16 form a parallel pair which is in series with winding 142 between lines 126 and 128. The order of the parallel pair and winding 142 is unimportant. Winding 142 is arranged so as to have the same polarity as each of windings 140 and 146 but, in this embodiment, is wound about second core 148. Herein it will be assumed that winding 142 is characterized by a selectable reactance X3. Capacitor 14 is selected so as to have a high reactance Xc to the fundamental current. Trap winding 142 allows the reactance of the trap circuit 12 to be selected so as to target specific harmonic frequencies or frequency ranges.

Thus, trap circuit 12 is designed and configured so as to provide a relatively low reactance to harmonic load currents while providing a relatively high reactance to the fundamental current. As well known in the filter art and according to fundamental electrical principles, currents follow the path of lowest reactance. For this reason, load harmonics at central node 150 are effectively blocked by relatively high reactance winding 140 and are diverted through relatively low reactance winding 142 into trap circuit 12. The frequency characteristics of network 10 are determined by reactances X1, X2 and X3 and the value of capacitor 14.

The reactance $X_t$ (hereinafter the "trap reactance") of the harmonic current path established between the first and second lines 126 and 128 is proportional to inductive reactance X3 of trap winding 142 minus capacitive reactance Xc. The frequency characteristics of trap circuit 12 are determined by the ratio between the reactance X3 of the trap winding 42 and capacitive reactance Xc. Thus network 12 can be designed to mitigate specific harmonic currents by adjusting the winding reactance and the value of capacitor 14.

Line winding flux is proportional to winding ampere turns which is equal to the product of the current through the winding and the number of winding turns. For instance, where winding 140 includes N turns and I current, the flux is proportional to the product N×I. The through-inductance of the windings 140 and 146 is L=L1+L2−2M, where L1 is the inductance of first line winding 140, L2 is the inductance of second line winding 146 and M is the mutual inductance between the windings 140 and 146. The total through-inductance of network 10 is determined by taking into account also the inductance of the trap circuit 12.

Harmonic currents flowing from load 122 to system 120 must flow through either winding 140 or the trap circuit 12. At targeted harmonic current frequencies the first line winding reactance X1 is significantly greater than the trap circuit reactance $X_t$ and therefore a large portion of the harmonic currents flow through trap circuit 12.

The ratio of harmonic currents diverted through trap circuit 12 to harmonic currents flowing through first line 126 to power system 120 is inversely proportional to the ratio of trap reactance $X_t$ to first winding reactance X1 at any particular harmonic frequency and therefore, when windings 140, 142 and 146 and capacitor 14 are designed and selected properly, only residual levels of the harmonic currents flow back to power system 120. When network 12 is properly designed typically 80% to 90% or more of the harmonic currents are diverted through trap circuit 12.

Hence, the degree to which harmonic currents are eliminated is selectable by controlling the relative reactance levels of the windings 140, 142 and 146 and the capacitor 44.

Contrary to teachings in the '743 patent, experiments have shown that, when network components are properly selected, the resulting affects on power system operation of including two series line windings that have the same polarity are negligible.

In addition, it should be appreciated that the embodiment of FIG. 1 represents a compromise between networks that include three separate cores which are bulky and expensive but relatively easy to design due to no mutual couplings between windings and networks including a single core which are relatively less bulky and less expensive to configure but are more difficult to design because of mutual coupling that has to be understood and accounted for. Moreover, it should be appreciated that in the case of two core reactors the polarities of the windings that share a common core are irrelevant and that acceptable harmonic mitigating results can be obtained by either taking advantage of the teachings of the '743 patent or the teachings above regarding same polarity line windings.

Figure 2:
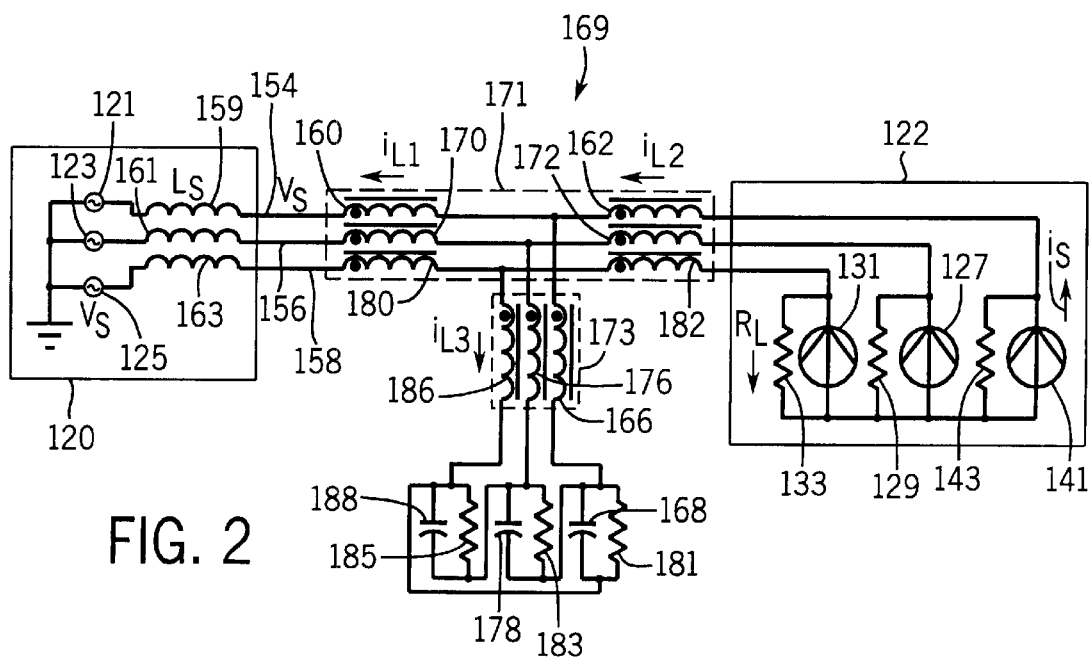
FIG. 2 is a schematic diagram similar to the diagram of FIG. 1, albeit of a three phase embodiment of the invention.

Referring now to FIG. 2, a three phase embodiment 169 of a harmonic mitigating network is illustrated in the context of a three phase power distribution system 120 and a three phase load. System 120 is modeled as including three separate AC sources 121, 123 and 125 linked to three source inductances 159, 161 and 163 to provide source voltages Vs on three supply lines 154, 156 and 158, respectively. Load 122 is modeled as three wye connected current sources 141, 127 and 131 linked to each of lines 154, 156 and 158, respectively. A separate load resistor 143, 129 and 133 is linked in parallel with each of current sources 141, 127 and 131, respectively.

Network 169 includes two separate cores 171 and 173 that form two separate reactors. A first reactor includes first core 171 and first and second line winding sets 160, 170, 180 and 162, 172, 182, respectively. First line windings 160, 170 and 180 are linked between separate lines 154, 156, 158 and inputs of respective second line windings 162, 172, 182. The second line winding 162, 172, 182 outputs are in turn linked to the three phase inputs of load 122. In accordance with the invention the second line windings 162, 172, 182 are oriented on core 171 so as to have the same polarity as first line windings 160, 170, 180.

Trap circuits including trap windings 166, 176 and 186 are each linked to separate lines 154, 156 and 158 at the outputs of windings 160, 170 and 180, respectively. In addition to including windings 166, 176 and 186, the trap circuits further include capacitors 168, 178 and 188 and parallel resistors 181, 183 and 185 that are linked to windings 166, 176 and 186, respectively, and form a delta configuration. As in the single phase embodiment described above with respect to FIG. 1, the trap windings in this three phase embodiment 169 are wound about the second core 173 so as to reduce the affects of mutual inductance on network operation and thereby facilitate simpler network design.

The operation of embodiment 169 is the same as the operation of the single phase embodiment 10 described with respect to FIG. 1 with harmonic currents in each phase being diverted through the lower reactance paths formed by the trap windings 166, 176 and 186 and capacitors 168, 178 and 188. As in the single phase embodiment, the positions of the windings 166, 176, 186 and the capacitors 168, 178, 188 within each respective trap circuit are interchangeable.

In addition, as indicated above, the advantages associated with two cores can be had independent of the polarity of the windings that share a common core. Thus, for instance, referring still to FIG. 2, while common core windings 160, 170, 180 and 162, 172 and 182 are shown as having the same polarity, the teachings of the '743 patent regarding opposite polarity windings may be combined with the teachings herein regarding two core networks to achieve advantageous network configurations.

Figure 3:
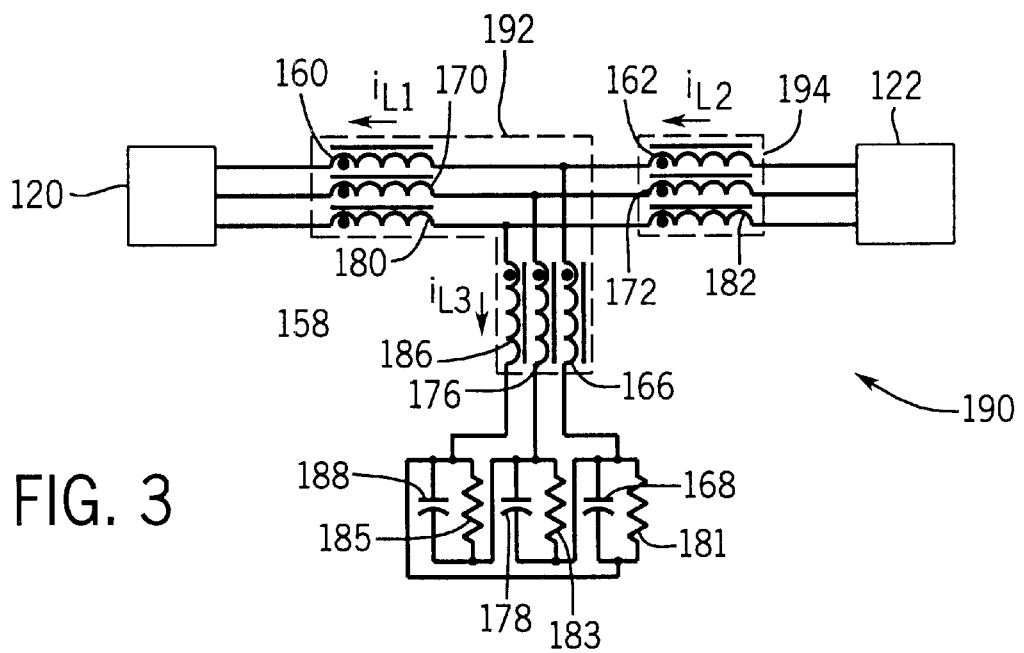
FIG. 3 is similar to FIG. 2, albeit of another three phase embodiment.

Referring to FIG. 3, another three phase embodiment 190 of the invention is illustrated. Many of the components in FIG. 3 are essentially identical to similarly enumerated components in FIG. 2 and therefore will not be described again here. The main difference between the FIG. 2 embodiment 169 and embodiment 190 is that the windings that share the common core are different. To this end, in embodiment 190 the first line windings 160, 170 and 180 and the trap windings 166, 176 and 186 are disposed on the same core 192 while second line windings 162, 172 and 182 are solely disposed on a second core 194. Once again, by employing two cores instead of one, mutual inductance design considerations are minimized and fewer components (e.g., separate cores) are required to configure a network than would be necessary in the case of three core networks. Also, in this case, the relative polarities of the windings are irrelevant as the line windings are incapable of canceling flux as taught by the '743 patent.

Although not illustrated, it should be appreciated that a third network configuration including two cores is possible where first line windings 160, 170 and 180 solely are disposed on a first core and second line windings 162, 172 and 182 and trap windings 166, 176 and 186 are together disposed on a second core. Again, in this case polarities of windings on the common core are irrelevant.

Figure 4:
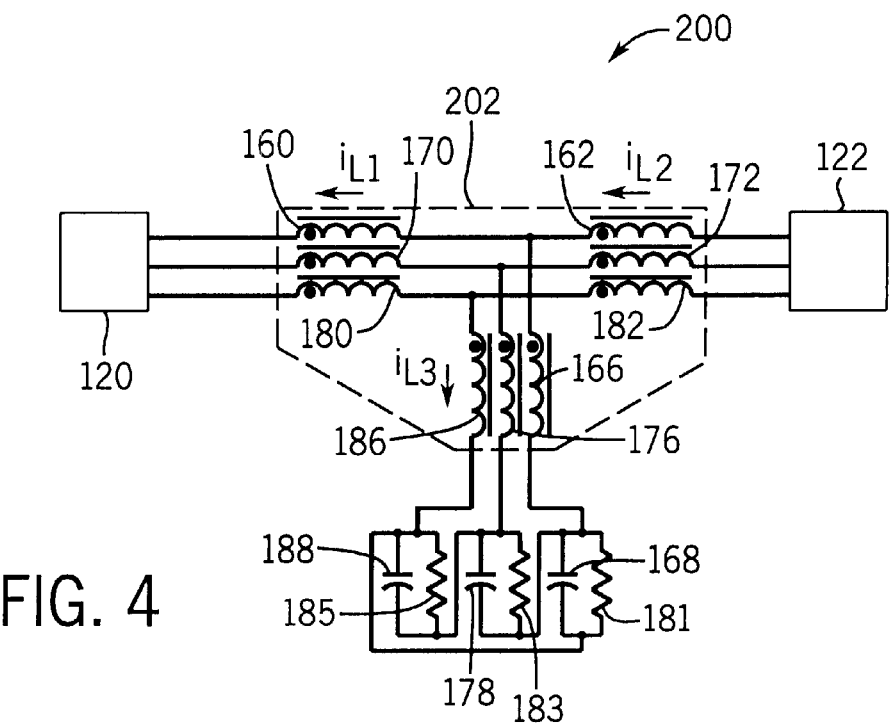
FIG. 4 is similar to FIG. 2, albeit of yet another three phase embodiment.

Referring now to FIG. 4, one other three phase embodiment 200 of the invention is illustrated. Again, many of the components that are included in embodiment 200 are similar to similarly enumerated components described above and therefore are not again explained here in detail. The main difference between the embodiment 200 in FIG. 4 and the other three phase embodiments is that all of the first line windings 160, 170 and 180, second line windings 162, 172 and 182 and trap windings 166, 176 and 186 are disposed on a single core 202. Here, where all network windings are disposed on one core 202, the invention is limited to one wherein the first and second line windings have the same polarity as indicated by the dots at the left end of each of first line windings 160, 170 and 180 and at the left end of each of the second line windings 162, 172 and 182. In addition, trap windings 166, 176 and 186 are also disposed so as to have the same polarity as the first line windings (e.g., winding 160).

With this single core configuration the core material required to configure network 200 is minimized. Again, by disposing the first and second line windings so as to have the same polarity, the reactances of the first and second line windings add and together mitigate flow of harmonics back to system 120 and therefore the voltage drop across the total inductance required to mitigate harmonics is kept at an acceptably low level.

Experimental results comparing the network of FIG. 4 with a similar network constructed in accordance with the teachings of the '743 patent (i.e., where the first and second line windings have opposite polarities) have shown essentially identical performance. For instance, in one experiment, first, second and tank windings were configured in a '743 patent configuration having inductance values of 70 $\mu$H, 0.7 $\mu$H and 23 $\mu$H, respectively to generate a first power grid line current waveform. In addition, first, second and tank windings were configured in the configuration of FIG. 4 having inductance values of 50 $\mu$H, 0.5 $\mu$H and 50 $\mu$H to generate a second power grid line current waveform. Upon comparison of the two waveforms distinctions were nearly impossible to identify. In both cases total harmonic distortion was approximately 8.6%.

It should be understood that the methods and apparatuses described above are only exemplary and do not limit the scope of the invention, and that various modifications could be made by those skilled in the art that would fall under the scope of the invention.

To apprise the public of the scope of this invention, the following claims are made.

What is claimed is:

1. The apparatus for mitigating harmonic currents generated by a load connected to a power distribution source via a supply line, the apparatus comprising:
   first and second magnetic cores;
   first and second series line windings linked between the supply line and the load; and
   at least one trap circuit including a series linked capacitor and trap winding linked at an intermediate node between the first and second line windings and an output connected to a second line;
   wherein the first and trap windings are disposed on the first magnetic core and the second winding is disposed on the second core.

2. The apparatus of claim 1 further including a capacitor in series with the trap winding between the first and second lines.

3. The apparatus of claim 1 wherein the source and load are three phase, the supply line is a first supply line, the first and second series windings are a first set of series windings and the load is also linked to the source via second and third supply lines and, wherein, the apparatus further includes:
   a second set of series windings including first and second series line windings linked between the second supply line and the load;
   a second trap circuit including a series linked capacitor and trap winding linked at a second intermediate node between the first and second line windings of the second set;
   a third set of series windings including first and second series line windings linked between the third supply line and the load; and
   a third trap circuit including a series linked capacitor and trap winding linked at a third intermediate node between the first and second line windings of the third set;
   wherein, each of the first windings and each of the trap windings is disposed on the first core and each of the second windings is disposed on the second core.

4. An apparatus for mitigating harmonic currents generated by a load connected to a power distribution source via a supply line, the apparatus comprising:
   at least one magnetic core including a first core;
   first and second line windings in series between a supply line and the load such that the first and second line windings are disposed on the first core so as to have the same polarity; and
   at least one trap circuit including a series linked capacitor and trap winding linked to an intermediate node between the first and second line windings with an output connected to a second line, the trap winding disposed on the at least one core;
   wherein, a reactance to harmonic currents between the load and the source is increased by the summation of fluxes generated by the line windings and a selected portion of the harmonic currents is diverted through the trap circuit.

5. The apparatus of claim 4 wherein the at least one core includes a second core and the trap winding is disposed on the second core.

6. The apparatus of claim 4 wherein the source and load are three phase, the first line winding includes a separate first line winding for each phase the second line winding includes a separate second line winding for each phase and the trap winding includes a separate trap winding for each phase.

7. The apparatus of claim 4 wherein the second line is a neutral point.

8. A method for mitigating harmonic currents generated by a load connected to a power distribution source via a supply line, the method comprising the steps of:
   providing first and second magnetic cores;
   providing first and second series line windings linked between the supply line and the load; and
   providing at least one trap circuit including a series linked capacitor and trap winding linked at an intermediate node between the first and second line windings and an output connected to a second line;
   disposing the first and trap windings on the first magnetic core and the second winding on the second core.

9. The method of claim 8 wherein the source and load are three phase, the supply line is a first supply line, the first and second series windings are a first set of series windings and the load is also linked to the source via second and third supply lines and, wherein, the apparatus further includes:

a second set of series windings including first and second series line windings linked between the second supply line and the load;

a second trap circuit including a series linked capacitor and trap winding linked at a second intermediate node between the first and second line windings of the second set;

a third set of series windings including first and second series line windings linked between the third supply line and the load; and a third trap circuit including a series linked capacitor and trap winding linked at a third intermediate node between the first and second line windings of the third set;

wherein, each of the first windings and each of the trap windings is disposed on the first core and each of the second windings is disposed on the second core.

10. The apparatus of claim 4 wherein the at least one core consists of the first core.

11. A method for mitigating harmonic currents generated by a load connected to a power distribution source, the method comprising the steps of:

providing at least one magnetic core including a first core;

providing first and second line windings and a trap winding;

disposing the first and second windings on the first core so as to have the same polarity;

linking the first and second line windings in series between a supply line and the load;

disposing the trap winding on the at least one core; and linking the trap winding to an intermediate node between the first and second line windings with an output linked to a second line;

wherein, a reactance between the load and the source is increased by the summation of fluxes generated by the line windings and a selected portion of the harmonic currents is diverted through the trap circuit.

12. The method of claim 11 wherein the step of providing at least one core includes providing the first and a second cores and wherein the step of disposing the trap winding includes disposing the trap winding on the second core.

13. The method of claim 11 wherein the step of providing at least one core includes the step of providing the first core.

14. An apparatus for mitigating harmonic currents generated by a load connected to a power distribution source, the apparatus comprising:

a single magnetic core;

first and second series line windings disposed on the core, the first winding linked to the source and the second winding linked to the load, the first and second line windings disposed such that the first and second windings have the same polarity; and at least one trap circuit including a series linked capacitor and trap winding linked at an intermediate node between the first and second line windings and an output connected to a second line;

wherein, a reactance between the load and the source is increased by the summation of fluxes generated by the line windings and a selected portion of the harmonic currents is diverted through the trap circuit.

* * * * *